(12) United States Patent
Wnuk et al.

(10) Patent No.: US 11,484,819 B2
(45) Date of Patent: Nov. 1, 2022

(54) FILTER DEVICE FOR FLUIDS

(71) Applicant: HYDAC PROCESS TECHNOLOGY GMBH, Neunkirchen (DE)

(72) Inventors: Ralf Wnuk, Bexbach/Kleinottweiler (DE); Hans-Josef Schmidt, Freisen (DE); Pascal Eric Vitte, Queensland (AU)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 0 days.

(21) Appl. No.: 17/280,959

(22) PCT Filed: Sep. 25, 2019

(86) PCT No.: PCT/EP2019/075898
§ 371 (c)(1),
(2) Date: Mar. 29, 2021

(87) PCT Pub. No.: WO2020/074260
PCT Pub. Date: Apr. 16, 2020

(65) Prior Publication Data
US 2021/0354061 A1  Nov. 18, 2021

(30) Foreign Application Priority Data
Oct. 9, 2018 (DE) .................. 10 2018 008 114.2

(51) Int. Cl.
*B01D 29/52* (2006.01)
*B01D 15/22* (2006.01)
*B01D 29/21* (2006.01)

(52) U.S. Cl.
CPC ............. *B01D 29/52* (2013.01); *B01D 15/22* (2013.01); *B01D 29/21* (2013.01);
(Continued)

(58) Field of Classification Search
CPC ........ B01D 29/52; B01D 15/22; B01D 29/21; B01D 2101/02; B01D 2201/0446; B01D 2201/301; B01D 29/54
See application file for complete search history.

(56) References Cited

U.S. PATENT DOCUMENTS

| 3,733,267 A | 5/1973 | Haase |
| 5,015,375 A | 5/1991 | Fleck |
| 2014/0124430 A1* | 5/2014 | Herges .................. B01D 29/52 210/323.1 |

FOREIGN PATENT DOCUMENTS

| DE | 2 118 777 | 12/1971 |
| DE | 2118777 A1 * | 12/1971 |

(Continued)

OTHER PUBLICATIONS

International Search Report (ISR) dated Nov. 19, 2019 in International (PCT) Application No. PCT/EP2019/075898.

*Primary Examiner* — Waqaas Ali
(74) *Attorney, Agent, or Firm* — Wenderoth, Lind & Ponack, L.L.P.

(57) ABSTRACT

A filter device for fluids has a filter housing (1), in which element receptacles (31) for a plurality of filter elements (33) are provided. The filter medium (35) of the filter elements (33) separates in the filter housing (1) a dirt side (5) from a clean side (7). The filter housing (1) can be opened for inserting and removing the filter elements (33). For the filter elements (33), a support basket (19) is provided, which can be inserted into the filter housing (1) and removed from the filter housing (1) and to which the filter elements (33) can be detachably fixed. The filter elements (33) have, in addition to the filter medium (35) for particle filtration, an adsorption medium (36).

17 Claims, 2 Drawing Sheets

(52) U.S. Cl.
 CPC .. *B01D 2101/02* (2013.01); *B01D 2201/0446* (2013.01); *B01D 2201/301* (2013.01)

(56) References Cited

FOREIGN PATENT DOCUMENTS

| | | | |
|---|---|---|---|
| DE | 26 16 954 | | 2/1977 |
| EP | 0 432 906 | | 6/1991 |
| GB | 1 346 569 | | 2/1974 |
| GB | 1346569 A | * | 2/1974 |
| KR | 10-2013-004182 | | 7/2013 |
| KR | 20-2013-0004182 | | 7/2013 |
| WO | 2014/067615 | | 5/2014 |

* cited by examiner

FILTER DEVICE FOR FLUIDS

FIELD OF THE INVENTION

The invention relates to a filter device for fluids, having a filter housing, in which element receptacles for a plurality of filter elements are provided. The filter medium of the filter elements separates in the filter housing a dirt side from a clean side. The filter housing can be opened for inserting and removing the filter elements. For the filter elements, a support in the manner of a basket is provided, which basket can be inserted into the filter housing and removed from the filter housing. The filter elements can be detachably fixed to the basket.

BACKGROUND OF THE INVENTION

From WO 2014/067615 A1, a generic filter device for fluids is known, in particular for low viscosity fluids such as water. The known solution is characterized in particular by the fact that for the filter elements used for particle filtration a support in the manner of a basket is provided. The basket can be inserted into the filter housing and removed from the filter housing. The filter elements can be detachably fixed to the basket. Because a basket carrying the filter elements is provided as an exchangeable insert of the filter housing, a large number of filter elements can be conjointly removed from the filter housing and inserted into the housing. This greatly simplifies any maintenance work assigned with replacing elements, even if the basket contains a large number of filter elements to achieve large filter surfaces. The known solution also permits their use under difficult conditions, such as on drilling platforms in off-shore oilfields. If an increase in pressure is required in the operation of concerned oilfields, treated seawater is pumped into the oilfield from a corresponding drilling platform. The known filter device provided for the treatment of sea water is formed for such applications for a filter surface of more than 500 $m^2$ at a filter fineness of 5 µm.

SUMMARY OF THE INVENTION

Starting from this prior art, the invention addresses the problem of further improving a filter device of the genus under consideration, while retaining its advantages, such as the aforementioned particular ease of maintenance, in such a way that its field of application and its possible applications are extended.

According to the invention, this problem is basically solved by a filter device having, as an essential feature of the filter device according to the invention, the filter elements used having, in addition to a filter medium for the particle filtration of fluids, an adsorption medium. In particular when gases are extracted from the ground, heavy metals, including mercury, dissolve from the soil. The dissolved soil can even be radioactive. Because of the adsorption medium that is used in the filter device at the filter elements, such substances can be successfully removed from the respective fluid, which can also be a pure gas stream. The filter device according to the invention can then not only be used to effectively achieve particle filtration by the respective filter element, but also an adsorption of environmentally harmful substances by the adsorption medium.

In a particularly preferred embodiment of the filter device according to the invention, the adsorption medium comprises activated carbon, preferably is formed entirely of activated carbon. The activated carbon used is formed as porous, fine-grained carbon having a large internal cleaning surface. Preferably, activated carbon is used as filling in the respective filter element.

In a further preferred embodiment of the filter device according to the invention, at least two filter elements, preferably three filter elements, are arranged one above the other to form a filter stack through which a receptacle element, preferably formed in the manner of a replacement cartridge, passes. The receptacle element comprises the adsorption medium. The filter stack forms a kind of stack, which can easily be replaced within the filter device. In particular, within the filter stack, the respective filter elements can be replaced separately from the respective receptacle element. In particular, there is the possibility to use a single receptacle element along the entire length of the filter elements, to be slid on, of a stack.

In an advantageous manner, it is further provided that the receptacle element has a cylindrical shell, which contains the adsorption medium as filling and which has fluid passage points for the fluid flow at least at its free, opposite end faces. The closed outer surface of the shell ensures that the activated carbon remains in the receptacle element as filling.

Further, it is advantageous that the respective filter element comprises a multilayered, pleated filter medium encompassing the shell of the receptacle element. Preferably, the filter medium is formed in the manner of a mesh pack, which is particularly suitable for the collection of particulate contaminants of any kind.

In a further preferred embodiment of the filter device according to the invention, it is provided that a fluid-permeable support tube of the filter element forming a structural unit in this respect is arranged between the respective filter medium and the assignable shell of the receptacle element. In this way, the pleated filter medium can rest against the interior of the assigned support tube during the flow through process. For a replacement process, the interior of the support tube of the respective filter element can then slide along the outer circumference of the encompassing shell of the receptacle element for the adsorbent without obstacles.

In advantageous embodiments, the basket comprises a supporting plate which, arranged in the installation position in the housing, separates the dirt side from the clean side and, to form the element receptacles, comprises fluid passages to which the filter elements can be detachably fixed. The fluid passages are then connected to the internal filter cavity encompassed by the filter medium.

With particular advantage, the arrangement in this case can be such that the filter housing has a circular-cylindrical section accommodating the basket and having an opening that can be closed by a removable cover. The opening the basket can be inserted and removed. The supporting plate is circular and in the installation position is circumferentially sealed against a housing wall.

The subject matter of the invention is also a filter candle, in particular for use within a filter device according to the invention. The filter candle has at least two filter elements, preferably three filter elements, formed as identical parts. In superposed arrangement each filter element comprises a filter medium encompassing an inner filter cavity. The filter medium accommodates at least one receptacle element having an adsorption medium, preferably in a replaceable manner in the form of a cartridge. In this way, the respective filter elements of a filter candle are arranged coaxially with respect to one another and are interconnected in a sealed manner at interacting end caps. In this way, the filter elements can be used to achieve a very large filter surface, while at the same time a high volume of contained adsorption medium for cleaning the fluid flow of heavy metals of any kind, including mercury and radioactive soil, is provided.

Furthermore, the subject matter of the invention is also a filter element having a filter medium encompassing an inner filter cavity. The filter medium is enclosed at each end by an end cap each, leaving an access to the filter cavity free. A receptacle element having an adsorption medium, preferably in replaceable manner, is contained in the filter cavity. In such an element solution, a particle filter is combined with a further filter in the form of an adsorption medium.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
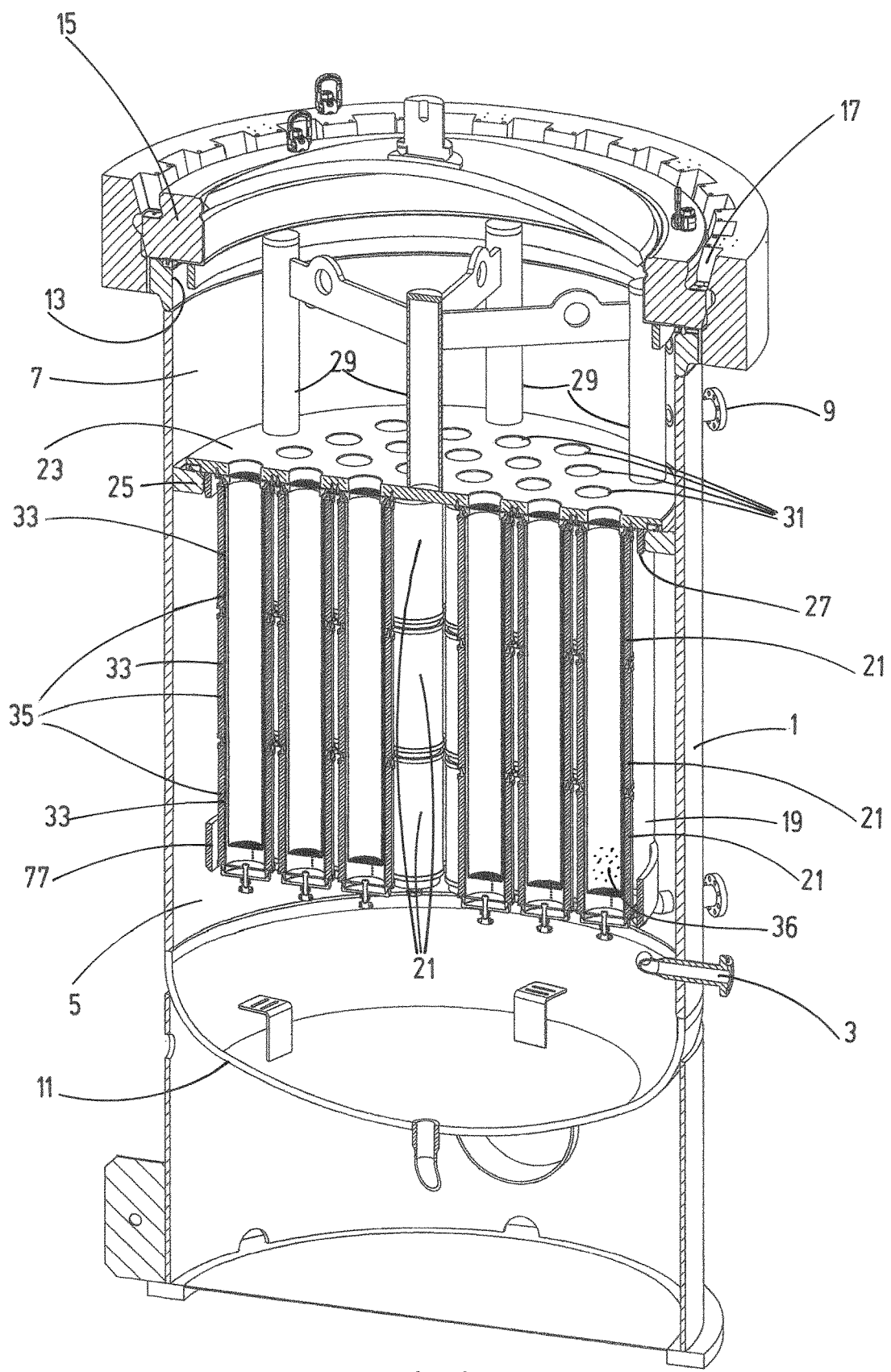
FIG. 1 is a perspective view in section of a filter device according to an exemplary embodiment of the invention as a whole.

FIG. 1 shows a filter housing 1 having a fluid inlet 3 for the inflow of unfiltered matter, for instance in the form of a contaminated fluid incurring during gas production and comprising components containing mercury, to a dirt-sided chamber 5 of the housing 1. An outlet 9 is located on the housing 1 at the clean-sided outflow chamber 7. The housing 1 is circular cylindrical, apart from a curved closed bottom part 11, having an upper opening 13 that can be closed using a removable cover 15. The cover 15 can be rotated and fixed to the housing 1 by a bayonet catch 17 in a detachable manner.

The filter arrangement includes a basket 19 as a support for a number of filter candles 21, which are not all numbered in the drawing, and is located between the dirt-sided inflow chamber 5 and the clean-sided outflow chamber 7. The basket 19 can be inserted into the housing 1 via the opening 13 and can be removed again therefrom if necessary. As a support element for the filter candles 21, the basket 19 has a circular supporting plate 23. When the basket 19 is inserted into its functional position in the housing 1, supporting plate 23 abuts on a contact ring 25 projecting from the interior of the housing 1. A collar 27 of the mounting plate 23 is sealed at the contact ring 25. In the housing 1, the supporting plate 23 separates the dirt-sided inflow chamber 5 from the clean-sided outflow chamber 7. To hold the basket 19 in contact with the contact ring 25, a plurality of rod-shaped downholders 29 are attached to the cover 15 and extend axially from the cover 15 through the outflow chamber 7 to the supporting plate 23.

The supporting plate 23 has a fluid passage 31 for every filter candle 21, only some of which are numbered in FIG. 1 for reasons of clarity. Accordingly, in the example shown in the drawing, 36 fluid passages 31 are provided for 36 filter candles 21. An element receptacle, to which the concerning filter candle 21 can be fixed in a detachable manner, is formed at every fluid passage 31.

Figure 2:
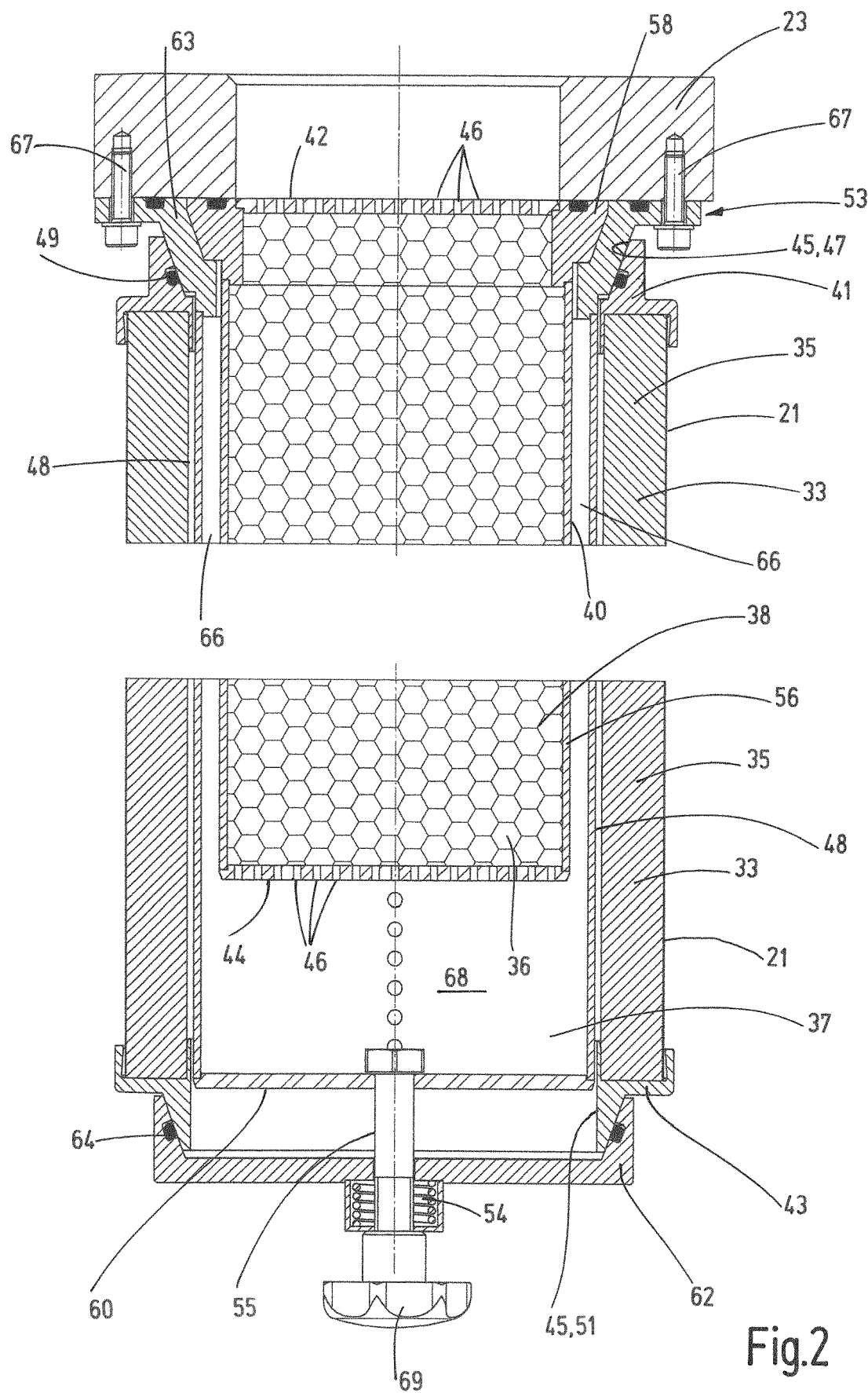
FIG. 2 is a side view in section through a filter candle of FIG. 1 with several, partially shown filter elements together with an adsorption element.

The filter candle 21, partially shown in an individual representation in FIG. 2, is each built of three stacked filter elements 33 formed by identical parts, in the manner of a stack. These filter elements have a filter medium 35, which, in a manner known per se, in the form of a hollow cylinder encompasses an inner filter cavity 37 and provides a large pleated filter surface. Such filter media may include a polyester material and/or polypropylene and may be multi-layered. In this case, the filter medium 35 may be encompassed outwardly by an additional support fabric. Likewise, a mesh pack can be provided here as a filter medium for particulate contaminants. At the ends, the filter medium 35 is enclosed by an end cap 41 and 43 each, which in the present example are formed of polyamide. The respective filter element 33 formed in this way as a disposable element can be fully incinerated. Such a filter element may provide a filter surface of approximately 5 $m^2$, such that a filter candle 21 having three filter elements 33 provides a filter surface of approximately 15 $m^2$. If a total filter surface of about 500 $m^2$ is required for a gas extraction application, this can be implemented by providing 36 spaces for filter candles 21, each having three filter elements 33, in the basket 19 of the filter housing 1, as partially shown in the illustrated example.

For an easy stacking of the filter elements 33 on top of each other, the end caps at one end are shaped differently from those at the other end in that a first type of end cap 41 has a shape complementary to a second type of end cap 43. More specifically, the end cap 41 of the first type each has a funnel 47, which encompasses the cap opening 45, axially projecting and widening conically towards the outside. On the interior of that funnel, there is an O-ring 49. The end cap 43 of the second type has an axially projecting annular body 51 adjoining the opening 45. That annular body 51 forms an outer cone for a matching engagement within the funnel 47 of the end cap 41 of the first type. Therefore, when the individual elements 33 are simply assembled to form the filter candle 21, an axial-radial seal is formed each between of the end caps 41, 43. In FIG. 2, only the lowermost and uppermost elements 33 are partially shown. The central, third element has been omitted for simplicity of presentation.

The filter candles 21 can be detachably fixed to the fluid passages 31 of the supporting plate 23 of the basket 19 by a connecting device or connector 53, which has a conical ring 63 that is bolted to the supporting plate 23 using bolts 67. To the conical ring 63, a shell 40 is attached, to which one end of a connecting rod 55 is fixed. The connecting rod 55 extends in axial direction beyond the lower end of a filter candle 21 to be fixed. In the area of the corresponding end, the connecting rod 55 is provided with a handle 69. Handle 69 is spring-supported via a disc spring package 54 to keep the stacked filter elements 33 together and in position on the supporting plate 23.

The handle 69 is provided at the lower free end of the connecting rod 55 on the spring package 54 to hold the concerning filter candles 21 in position such that the elements 33 are mutually sealed at the end caps 41, 43 and the end cap 41 of the uppermost element 33 is connected to the fluid passage 31 of the supporting plate 23 in a fluid conveying manner via an additional conical ring 63. The clean-sided filter cavity 37 is connected to the outflow chamber 7 via the fluid passage 31 and is connected to the dirt-sided inflow chamber 5 via the filter medium 33 of the filter candles 21, but is sealed in any other way.

When the basket 19 together with used filter candles 21 is lifted out of the housing 1 for a replacement, for instance by attaching a lifting means to lifting eyes, and is deposited in a position, in which the underside of the basket 19 is freely accessible, the filter candles 21 can be released by releasing the handle 69. As FIG. 1 shows, the basket 19 has an enclosing ring 77, which is concentric with the collar 27 of the supporting plate 23, which encompasses the group of filter candles 21 at their lower, free end and which is connected to the collar 27 by struts, which are welded to the collar 27 and the ring 77 and to which lifting eyes are also attached for handling the basket 19.

As shown in particular in FIG. 2, a cartridge-shaped receptacle element 38 extends substantially along the entire length of all filter elements 33 of the filter candle 21 or of the filter stack. The receptacle element 38 has a cylindrical circumferential shell 40, which is formed to be closed. At its opposite end faces 42, 44, the corresponding end walls are provided with fluid passage points 46, not all of which are shown in FIG. 2. In particular, the lower end face 44 or end wall is formed to protrude in a hood-shaped manner towards the shell 40, such that the fluid passage points 46 are also arranged on the outer periphery of the hood 56. The adsorption medium 36 is present as filling in the receptacle element 38 and is formed of activated carbon for separating heavy metals, such as mercury, from a fluid stream. Referring to FIG. 2, the upper end of the shell 40 of the receptacle element 38 is firmly connected to a retaining ring 58. The conical outer circumferential surface of retaining ring 58 is flush with the conical inner circumferential surface of the conical ring 63 in the assembled state.

In other respects, viewed in the direction of FIG. 2, the upper end face of the retaining ring 58 rests on the supporting structure or supporting plate 23. When the filter candle 21 as a whole, as described, is removed from the supporting plate 23, the receptacle element 38 can be withdrawn as a cartridge from the three superposed filter elements 21, which as a whole co-form the filter candle 21. In this case, the outer circumference of the shell 40 slides on the inner circumference of a support tube 48. Preferably, one support tube 48 is used for three filter elements 21 of a filter candle. On the outer circumference of support tube 48, the respective filter medium 35 of an assignable filter element 21 rests. For this purpose, as seen in FIG. 2, the top of the perforated support tube 48 is connected to the conical ring 63. The bottom of the perforated support tube 48 has an end plate 60 through which the fixing rod 55 passes. The support tube 48 can be removed to this extent from the fixing rod 55 after releasing the individual filter elements 33 by the handle 69.

According to the illustration of FIG. 2, the end cap 43 of the lower filter element 33 rests on a conically extending inner circumferential side of an end cover 62, which carries an annular seal 64 on its transition side towards the end cap 43. After using the handle 69 to remove the end cover 62, while releasing the respective filter candle 21 from the supporting plate 23, the individual filter elements 33 can be pulled off the support tube 48 for their replacement. In this respect, the handle 69 together with the spring package 54 and at least parts of the connecting rod 55 remain on the end cover 62.

In operation, the filter candle 21 with its individual filter elements 33 together with the assignable filter media 35 are flowed through from the outside towards the inside. In the process, any particle contamination in the fluid flow is cleaned off by the respective filter medium 35. The fluid stream then cleaned of particulate contaminants. After passing through the perforated support tube 48, the fluid stream enters an annular space 66 between the support tube 48 and the shell 40. The fluid located in the gap-shaped annular space 66 then flows, as seen in the viewing direction of FIG. 2, from the top downwards into a collection chamber 68, and then passes through the hood 56 via the lower fluid passage points 46. In this way, the fluid enters the receptacle element 38 having the adsorption medium 36 and flows through the adsorption medium from bottom to top and leaves the filter candle 21 via the upper fluid passage points 46 and the free cylindrical cross-section of the retaining ring 58, in order to reach via the fluid openings 31 in the supporting plate 23 and then the clean chamber 7 with its discharge outlet 9. The adsorption medium 36 removes any heavy metals, such as mercury, such that the fluid flow in the clean chamber 7 is freed from environmentally harmful substances, in addition to particle contamination.

While one embodiment has been chosen to illustrate the invention, it will be understood by those skilled in the art that various changes and modifications can be made therein without departing from the scope of the invention as defined in the claims.

The invention claimed is:

1. A filter device for fluids, comprising: a filter housing with clean and dirty sides therein;
   a plurality of filter elements in the filter housing separating the clean and dirty sides, each of the filter elements having a filter medium, the filter housing being openable permitting inserting and removing of the filter elements into and out of the filter housing, the filter elements being arranged in stacks of a least two of the filter elements extending coaxially;
   a support basket removably mounted in the filter housing, the filter elements being detachably coupled to the support basket;
   a receptacle element extending within each of the stacks and having a laterally closed cylindrical shell with fluid passage points at free opposite axial end faces of the closed cylindrical shell;
   wherein each of the filter elements comprises a fluid-permeable supported tube arranged between the filter medium and the cylindrical shell thereof; and
   an adsorption medium in the receptacle element.

2. A filter device according to claim 1 wherein each element receptacle is a replaceable cartridge.

3. A filter device according to claim 1 wherein the adsorption medium comprises activated carbon.

4. A filter device according to claim 1 wherein the adsorption medium is entirely of activated carbon.

5. A filter device according to claim 1 wherein the filter medium of each of the filter element comprises a multilayered, pleated filter medium encompassing the cylindrical shell of the receptacle element.

6. A filter device according to claim 1 wherein the support basket comprises a support plate being arranged in the filter housing and separating the dirty and clean sides and comprises fluid passages therein to which the filter elements are detachably coupled, each of the fluid passages being in direct fluid communication with an inner filter cavity encompassed by the filter medium of the respective filter element.

7. A filter device for fluids, comprising:
   a filter housing with clean and dirty sides therein;
   a plurality of filter elements in the filter housing separating the clean and dirty sides, each of the filter elements having a filter medium, the filter housing being openable permitting inserting and removing of the filter elements into and out of the filter housing, the filter elements being arranged in stacks of a least two of the filter elements extending coaxially;

a support basket removably mounted in the filter housing, the filter elements being detachably coupled to the support basket;

a receptacle element extending within each of the stacks and having a laterally closed cylindrical shell with fluid passage points at free opposite axial end faces of the closed cylindrical shell;

an adsorption medium in the receptacle element;

wherein the filter housing comprises a circular cylindrical section in which the support basket is mounted and comprises an opening closed by a removable cover, the support basket being insertable in and removable from the filter housing through the opening and having a circular supporting plate sealed to a housing wall of the filter housing in an installed position of the support basket in the filter housing.

8. A filter device according to claim 1 wherein the closed cylindrical shell has axial end walls with the fluid passage points therein.

9. A filter device according to claim 8 wherein the adsorption medium fills all space inside the closed cylindrical shell between the axial end walls.

10. A filter element according to claim 7 wherein each element receptacle is a replaceable cartridge.

11. A filter element according to claim 7 wherein the adsorption medium comprises activated carbon.

12. A filter element according to claim 7 wherein the adsorption medium is entirely of activated carbon.

13. A filter element according to claim 7 wherein the filter medium of each of the filter element comprises a multilayered, pleated filter medium encompassing the cylindrical shell of the receptacle element.

14. A filter element according to claim 7 wherein each of the filter elements comprises a fluid-permeable supported tube arranged between the filter medium and the cylindrical shell thereof.

15. A filter element according to claim 7 wherein the inner filter cavity is enclosed at each axial end thereof by an end cap with an access to the inner filter cavity; and the receptacle element is replaceable in the filter cavity.

16. A filter element according to claim 7 wherein the closed cylindrical shell has axial end walls with the fluid passage points therein.

17. A filter element according to claim 16 wherein the adsorption medium fills all space inside the closed cylindrical shell between the axial end walls.

* * * * *